United States Patent
Clements et al.

(10) Patent No.: US 12,077,342 B2
(45) Date of Patent: Sep. 3, 2024

(54) PACKAGED YOGURT-BASED FOOD PRODUCT AND METHOD FOR PACKAGING THE YOGURT-BASED FOOD PRODUCT

(71) Applicant: General Mills, Inc., Minneapolis, MN (US)

(72) Inventors: Rob G Clements, Plymouth, MN (US); Paul Allen Grube, Jordan, MN (US); William R Lloyd, III, Chanhassen, MN (US); John Thomas Lund, Dedham, MA (US); David L Persells, New Richmond, WI (US); Terry W Ziegler, St. Louis Park, MN (US)

(73) Assignee: General Mills, Inc., Minneapolis, MN (US)

( * ) Notice: Subject to any disclaimer, the term of this patent is extended or adjusted under 35 U.S.C. 154(b) by 347 days.

(21) Appl. No.: 16/365,193

(22) Filed: Mar. 26, 2019

(65) Prior Publication Data
US 2019/0217993 A1  Jul. 18, 2019

Related U.S. Application Data

(62) Division of application No. 15/797,154, filed on Oct. 30, 2017, now Pat. No. 11,401,075.

(51) Int. Cl.
*B65D 25/54* (2006.01)
*A23C 9/133* (2006.01)
(Continued)

(52) U.S. Cl.
CPC .............. *B65D 25/54* (2013.01); *A23C 9/133* (2013.01); *B65B 3/04* (2013.01); *B65B 39/00* (2013.01);
(Continued)

(58) Field of Classification Search
CPC ........ B65D 25/54; B65D 85/72; B65D 85/70; B65D 85/804; B65B 3/04; A23C 9/1544; A23G 9/48; A23G 3/54; A23G 3/545
See application file for complete search history.

(56) References Cited

U.S. PATENT DOCUMENTS 2,511,082 A * 6/1950 Rubin ..................... A23G 9/48
                                                    426/90
2,862,822 A   12/1958 Whitmore
(Continued)

FOREIGN PATENT DOCUMENTS

DE     3537753     4/1987
EP     1980153    10/2008
(Continued)

OTHER PUBLICATIONS

Formal Human Translation of Bergmiller DE3537753. Published Apr. 23, 1987. (Year: 1987).*
(Continued)

*Primary Examiner* — Ericson M Lachica
(74) *Attorney, Agent, or Firm* — Jordan IP Law, LLC; Annette M. Frawley, Esq.

(57) ABSTRACT

A yogurt-based food product is packaged in a container, including a bottom wall and a sidewall, by depositing a mix-in in a center of the bottom wall and then driving the mix-in from the center of the bottom wall to the sidewall with a blast of gas. Afterwards, a dairy or plant-based product is deposited in the container. The mix-in is in contact with the bottom wall and the sidewall, and a height of the mix-in is greater at the sidewall than at a center point of the bottom wall.

15 Claims, 2 Drawing Sheets

(51) Int. Cl.
   *B65B 3/04*        (2006.01)
   *B65B 39/00*       (2006.01)
   *B65D 85/72*       (2006.01)

(52) U.S. Cl.
   CPC .......... *B65D 85/72* (2013.01); *A23C 2270/05* (2013.01); *B65B 2220/14* (2013.01)

(56) References Cited

U.S. PATENT DOCUMENTS

| | | | | |
|---|---|---|---|---|
| 4,184,613 | A * | 1/1980 | Kinney | A23G 9/282 |
| | | | | 141/105 |
| 6,063,419 | A * | 5/2000 | Roche | B65B 3/10 |
| | | | | 426/130 |
| 2002/0150655 | A1* | 10/2002 | O'Donnell Kiely | A23G 3/50 |
| | | | | 426/89 |
| 2007/0092626 | A1* | 4/2007 | Singer | A23C 9/133 |
| | | | | 426/599 |
| 2010/0159081 | A1* | 6/2010 | Lind | A23G 9/28 |
| | | | | 426/90 |
| 2011/0003034 | A1* | 1/2011 | Netzer | A23G 9/045 |
| | | | | 426/61 |
| 2011/0200718 | A1* | 8/2011 | Swertvaegher | A23C 9/00 |
| | | | | 426/130 |
| 2011/0244077 | A1 | 10/2011 | Belferman et al. | |
| 2013/0209649 | A1 | 8/2013 | Chanet et al. | |
| 2013/0259980 | A1* | 10/2013 | Caldwell | A23G 9/48 |
| | | | | 426/94 |
| 2014/0295030 | A1* | 10/2014 | Downes | A23C 9/133 |
| | | | | 426/86 |
| 2015/0164105 | A1* | 6/2015 | Peskin | A23G 9/045 |
| | | | | 426/119 |

FOREIGN PATENT DOCUMENTS

| | | |
|---|---|---|
| GB | 2474902 | 5/2011 |
| WO | WO 2016/124958 | 8/2016 |

OTHER PUBLICATIONS

"Greek Yogurt Soft Sugar Cookies." Oct. 28, 2013. <https://lovelylittlekitchen.com/greek-yogurt-soft-sugar-cookies/>. Accessed Dec. 10, 2019. (Year: 2013).*

* cited by examiner

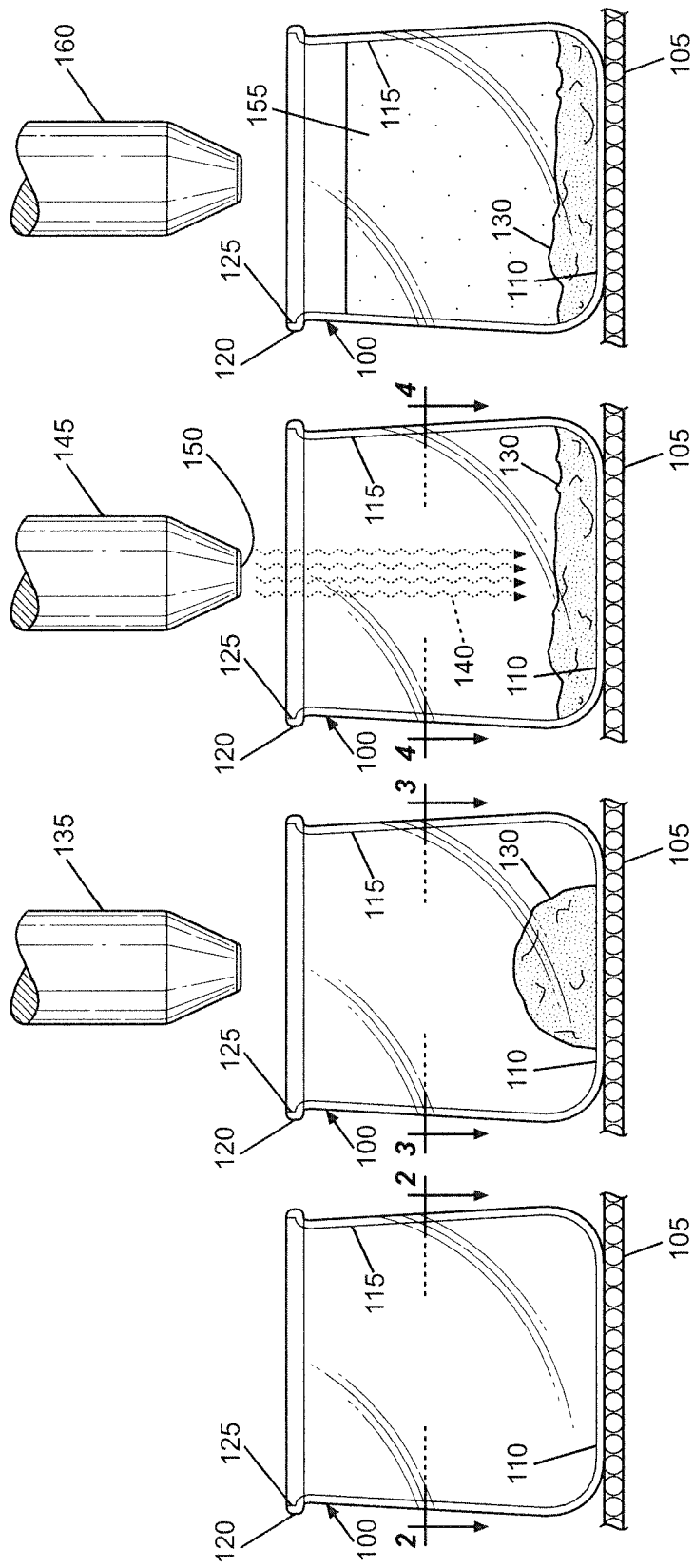

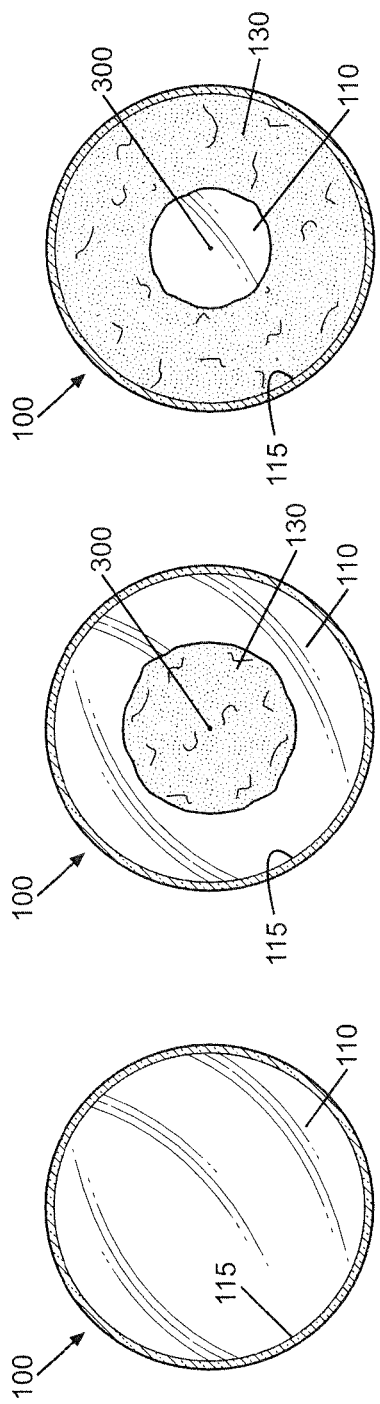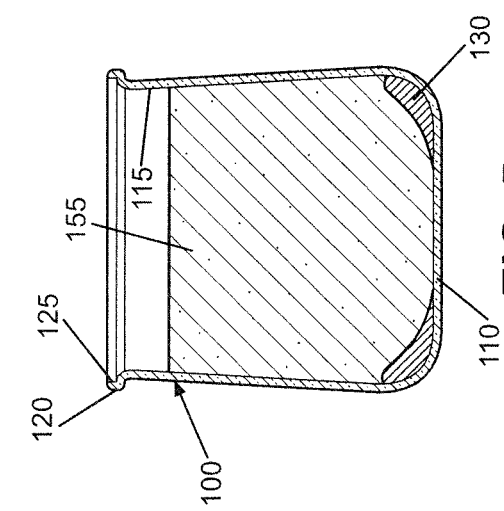

PACKAGED YOGURT-BASED FOOD PRODUCT AND METHOD FOR PACKAGING THE YOGURT-BASED FOOD PRODUCT

CROSS-REFERENCE TO RELATED APPLICATIONS

This application represents a divisional application of U.S. patent application Ser. No. 15/797,154, filed Oct. 30, 2017, pending. The entire content of this application is incorporated herein by reference.

BACKGROUND OF THE INVENTION

The present invention pertains to cultured dairy-based and cultured plant-based yogurt-type products and, more particularly, to the packaging of cultured dairy-based and cultured plant-based yogurt-type products.

It has been found that, when consumers are deciding which of a selection of goods to purchase, consumers consider the packaging of the different goods. Accordingly, it is important to evaluate the packaging of goods when offering goods for sale, especially if the goods are sold adjacent to competing goods. In the context of food products, food products are often sold in supermarkets next to other competing products. As such, significant effort is frequently put into creating food product packaging that both grabs the attention of consumers and makes the products more appealing upon inspection.

Regarding yogurt in particular, yogurt is sometimes sold packaged with additional ingredients. Such ingredients can include fruit and granola, for example. The ingredients can be pre-mixed with the yogurt, or the ingredients can be packaged with the expectation that the consumer will mix them with the yogurt prior to or during consumption, as with fruit-on-the-bottom yogurt, for example. It would be desirable to be able to highlight these ingredients using product packaging.

SUMMARY OF THE INVENTION

In view of the above, the present invention provides yogurt-based food products with packaging that highlights the mix-in ingredients included with the yogurt, as well as methods of producing such products. Specifically, fruit is deposited in a transparent or translucent container. As the fruit tends to clump in the middle of the container, the fruit may not be readily visible once the container is filled. To remedy this, a blast of gas, such as air, is used to drive the fruit outward from the center of the container to the sides of the container prior to the remainder of the container being filled. This makes it easier for a consumer to see the fruit in the resulting product.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 1A illustrates a first portion of a process for packaging a yogurt-based food product in accordance with the present invention, wherein a container is initially empty;

FIG. 1B illustrates a second portion of the process, wherein a mix-in is deposited in the center of the container;

FIG. 1C illustrates a third portion of the process, wherein the mix-in is driven from the center of the container to the sidewall of the container;

FIG. 1D illustrates a fourth portion of the process, wherein a dairy product is deposited in the container;

FIG. 2 is a cross section of the container as shown in FIG. 1A;

FIG. 3 is a cross section of the container as shown in FIG. 1B;

FIG. 4 is a cross section of the container as shown in FIG. 1C; and

FIG. 5 is another cross section of the container.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

With initial reference to FIGS. 1A-D, a process for packaging a yogurt-based food product in accordance with the present invention is illustrated. In general, the packaging of the food product involves: 1) depositing a mix-in in an empty container; 2) dispersing the mix-in within the container; and 3) depositing a dairy product in the container. Of course, it should be recognized that additional steps are involved in producing the yogurt-based food product including, for example, preparation of the mix-in and dairy product and sealing of the container. As these steps are not the focus of the present invention and are known in the art, certain of these steps are not discussed, while others are discussed in only limited detail.

In FIGS. 1A-D, a container 100 is shown being transported by a conveyor system, specifically, a conveyor belt 105. Container 100 includes a bottom wall (or base) 110, a sidewall 115 and a rim 120. Rim 120 defines an opening 125, which is sealed by a lid in a later step (not shown). Container 100 is made from a fully or partially transparent or translucent material so that the contents of container 100 are at least partially visible through sidewall 115. Preferably, container 100 is made from glass, or a plastic such as polypropylene.

By container 100 being "partially" transparent or translucent, it is meant that at least a portion of container 100 is not transparent or translucent, i.e., some portion of container 100 is opaque. For example, bottom wall 110 or a portion of sidewall 115 can be opaque. For purposes of the present invention, the term "translucent" covers the range between transparent and opaque.

In the process of the present invention, container 100 is initially empty, as shown in FIG. 1A. Next, a mix-in 130 is deposited in container 100 by a depositor 135, as shown in FIG. 1B. Preferably, mix-in 130 is a viscous liquid. In one embodiment, mix-in 130 comprises fruit, such as strawberries, blueberries, cherries, lemons or peaches. In another embodiment, mix-in 130 comprises coconut. When a viscous liquid is used, mix-in 130 tends to clump in the center of container 100, particularly the center of bottom wall 110, and form a partial sphere, as shown in FIG. 1B. As a result, if the remaining contents were added to container 100 at this point, mix-in 130 would not be visible through sidewall 115 (so long as the contents are opaque, which is expected). This is considered undesirable since the goal is for consumers to be able to see mix-in 130 at the time of purchase.

To rectify this problem, mix-in 130 is driven from the center of bottom wall 110 toward sidewall 115 using a blast of gas 140 provided by a source of compressed gas 145, as shown in FIG. 1C. Source 145 includes a nozzle 150 through which the gas passes. In one embodiment, sterilized air is used as the gas. However, other gases or combinations of gases can be used, e.g., carbon dioxide ($CO_2$) or nitrogen ($N_2$). Source 145 is configured so that blast 140 is sufficiently strong to drive mix-in 130 toward sidewall 115 but not so strong as to cause mix-in 130 to splatter all over sidewall 115. The strength of blast 140 depends on a variety of factors, including the pressure used, the size and shape of nozzle 150 and the distance between nozzle 150 and mix-in 130. Source 145 is also configured so that blast 140 is of a sufficient duration to drive mix-in 130 all the way to sidewall 115 such that mix-in 130 contacts sidewall 115. Because of the viscosity of mix-in 130, mix-in 130 tends to remain in contact with sidewall 115 once driven there. Accordingly, when the remaining contents are added to container 100, mix-in 130 is still visible through sidewall 115. This is illustrated in FIG. 1D, where a dairy product 155 is deposited in container 100 by a depositor 160. In one embodiment, dairy product 155 comprises milk, which is later fermented in container 100 to form yogurt in a pot-set method. As such, dairy product 155 preferably further comprises a yogurt culture. Alternatively, dairy product 155 can comprise yogurt. In one embodiment, after container 100 is filled with dairy product 155, mix-in 130 comprises 15% of the contents of container 100 by weight. Preferably, when dairy product 155 is deposited in container 100 by depositor 160, dairy product 155 is sprayed against sidewall 115 so that dairy product 155 runs down sidewall 115. In combination with the viscosity of mix-in 130, this gentler deposition helps mix-in 130 remain in contact with sidewall 115.

After dairy product 155 is deposited in container 100, container 100 is sealed. Specifically, opening 125 is sealed. If dairy product 155 comprises milk, container 100 is held at an elevated temperature for an extended time period (e.g., four hours) to cause fermentation of the lactose in the milk. Container 100 is then rapidly cooled.

With reference now to FIG. 2, a cross section of container 100, taken along line 2-2 of FIG. 1A, is provided. Container 100 is empty at this point in the process. As a result, bottom wall 110 is clearly visible. In addition, it can be seen that container 100 has a circular cross section. In combination with FIGS. 1A-D, it should be recognized that bottom wall 110 has a circular shape and sidewall 115 has the shape of a tapered cylinder. Of course, other shaped containers can be used with the present invention including containers having multiple sidewalls. For example, container 100 could have a rectangular cross section (when viewed along line 2-2).

FIG. 3 is a cross section of container 100 taken along line 3-3 of FIG. 1B. Mix-in 130 is clumped in the center of container 100 and therefore covers the central portion of bottom wall 110 without contacting sidewall 115. In particular, mix-in 130 covers a center point 300 of the circle defined by bottom wall 110.

FIG. 4 is a cross section of container 100 taken along line 4-4 of FIG. 1C. At this point, mix-in 130 has been driven from the center of container 100 to sidewall 115. Specifically, blast 140 drives mix-in 130 outward in all directions simultaneously such that mix-in 130 contacts and extends up sidewall 115 and need not cover center point 300, i.e., mix-in 130 forms a torus. This can also be seen in FIG. 5, which is another cross section of container 100, taken after dairy product 155 has been deposited in container 100. The height of mix—130 within container 100 is highest proximate sidewall 115 and gradually decreases toward the center of container 100, with no mix-in 130 covering center point 300.

In general, the goal is for mix-in 130 to be readily visible through sidewall 115. Accordingly, mix-in 130 is driven from the center of container 100 and up sidewall 115. However, it is not required that center point 300 be completely uncovered. Rather, the height of mix-in 130 is preferably greater at sidewall 115 than at center point 300. Similarly, it is not required that the entirety of container 100 be transparent or translucent. Instead, it is preferred that at least the portion of sidewall 115 contacted by mix-in 130 is transparent or translucent. As such, bottom wall 110, rim 120 and some or all of the portion of sidewall 115 not contacted by mix-in 130 can be opaque, if desired.

While the discussion above focuses on a dairy-based yogurt product, the present invention is not limited to such products. For purposes of the present invention, "yogurt" includes both cultured dairy-based and cultured plant-based yogurt-type products. Cultured plant-based yogurt-type products can be made from almonds, cashews, coconuts or soy, for example. In such cases, a liquid plant-based product is used in place of dairy product 155.

Based on the above, it should be readily apparent that the present invention provides a way to highlight a mix-in ingredient included as part of a yogurt-based food product. Specifically, the mix-in is driven to a sidewall of a transparent or translucent container so that the mix-in is visible through the sidewall. While certain preferred embodiments of the present invention have been set forth, it should be understood that various changes or modifications could be made without departing from the spirit of the present invention. In general, the invention is only intended to be limited by the scope of the following claims.

The invention claimed is:

1. A packaged food product comprising:
    a container including a bottom wall and a sidewall;
    a mix-in located in the container, wherein the mix-in is in contact with the bottom wall and the sidewall, the mix-in has a viscosity wherein the mix-in in contact with the sidewall remains in contact with the sidewall, a height of the mix-in is greater at the sidewall than at a center point of the bottom wall, the mix-in does not cover the center point of the bottom wall, and the height of the mix-in decreases from the sidewall toward the center point of the bottom wall; and
    a dairy or plant-based product located in the container and disposed upon the mix-in,
    wherein the container is fully or partially transparent or translucent from the bottom wall to the height of the mix-in at the sidewall.

2. The packaged food product of claim 1, wherein the mix-in is in the shape of a torus.

3. The packaged food product of claim 1, wherein the mix-in is not splattered over the sidewall.

4. The packaged food product of claim 1, wherein the container is made from glass.

5. The packaged food product of claim 1, wherein the mix-in comprises fruit or coconut.

6. The packaged food product of claim 5, wherein the fruit is strawberries, blueberries, cherries, lemons or peaches.

7. The packaged food product of claim 5, wherein the mix-in comprises coconut.

8. The packaged food product of claim 1, wherein the dairy or plant-based product comprises milk.

9. The packaged food product of claim 8, wherein the dairy or plant-based product further comprises a yogurt culture.

10. The packaged food product of claim 1, wherein the dairy or plant-based product comprises yogurt.

11. A packaged food product comprising:
a container including a bottom wall and a sidewall;
a mix-in located in the container, wherein the mix-in is in the shape of a torus and in contact with the bottom wall and the sidewall, a height of the mix-in is greater at the sidewall than at a center point of the bottom wall, and a majority of the mix-in is located at an intersection of the bottom wall and the sidewall; and
a dairy or plant-based product located in the container and disposed upon the mix-in in the shape of a torus.

12. The packaged food product of claim 11, wherein at least a portion of the sidewall is transparent or translucent.

13. The packaged food product of claim 11, wherein the dairy or plant-based product comprises milk.

14. The packaged food product of claim 13, wherein the dairy or plant-based product further comprises a yogurt culture.

15. The packaged food product of claim 11, wherein the dairy or plant-based product comprises yogurt.

\* \* \* \* \*